(No Model.)
N. O. STARKS & A. G. FELLAND.
TRANSPLANTER.
No. 486,200. Patented Nov. 15, 1892.
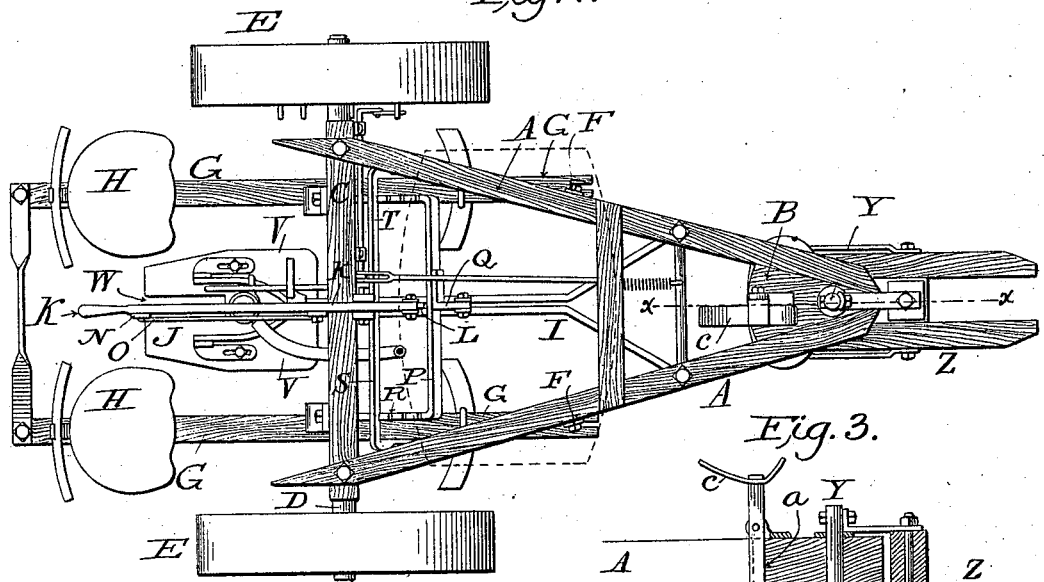
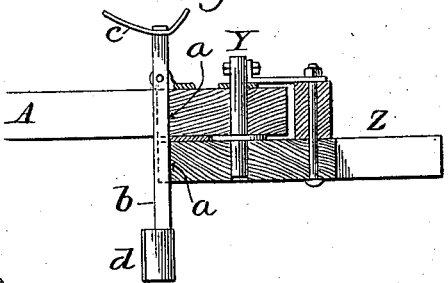
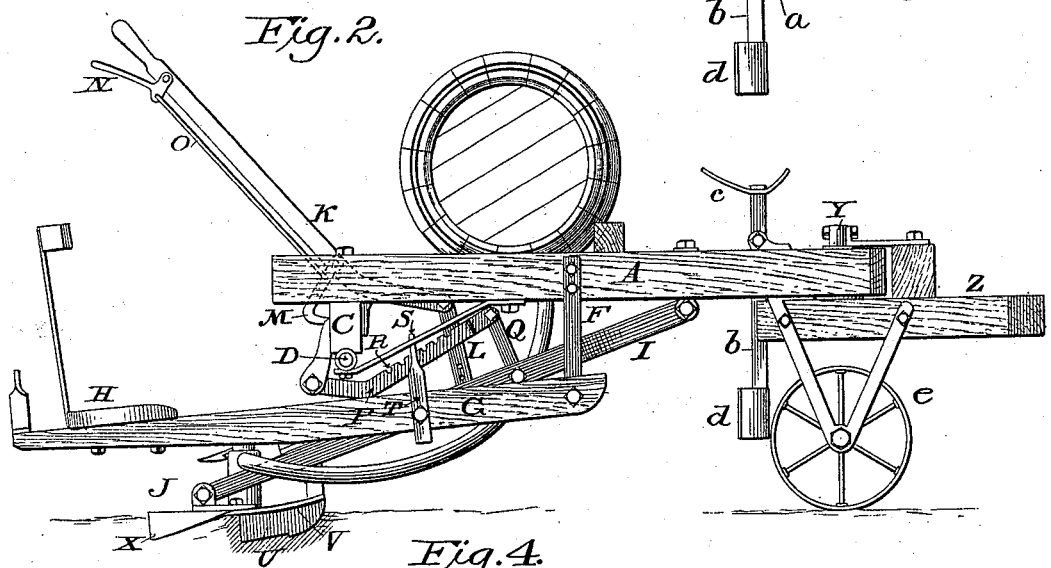
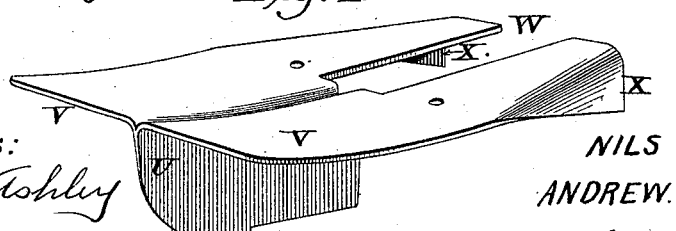
Witness:
Arthur Ashley
James F. Duhamel
NILS O. STARKS
ANDREW. G. FELLAND
Inventors:
by Dodge & Sons
Attys.

UNITED STATES PATENT OFFICE.

NILS O. STARKS AND ANDREW G. FELLAND, OF MADISON, WISCONSIN, ASSIGNORS TO THE FULLER & JOHNSON MANUFACTURING COMPANY, OF SAME PLACE.

TRANSPLANTER.

SPECIFICATION forming part of Letters Patent No. 486,200, dated November 15, 1892.

Application filed March 21, 1892. Serial No. 425,787. (No model.)

*To all whom it may concern:*

Be it known that we, NILS O. STARKS and ANDREW G. FELLAND, citizens of the United States, residing at Madison, in the county of Dane and State of Wisconsin, have invented certain new and useful Improvements in Transplanters, of which the following is a specification.

Our invention relates to tobacco-transplanters; and it consists in various features and details hereinafter set forth and claimed.

In the accompanying drawings, Figure 1 is a top plan view of our improved machine; Fig. 2, a side elevation of the same; Fig. 3, a vertical sectional view on the line X X of Fig. 1, and Fig. 4 a perspective view of a combined furrow opener and coverer.

In its general plan the machine resembles that shown and described in Letters Patent of the United States granted to Frank A. Bemis March 18, 1890, and numbered 423,723 and 423,724, and the present invention may be considered as an improvement upon the machine represented in said Letters Patent.

The main frame of the machine comprises the longitudinal bars A A, connected at their forward ends by means of a block B and at their rear ends by a cross-bar C, as shown in Figs. 1 and 2. To the under side of the cross-bar C is secured the axle D, upon which are mounted the supporting-wheels E. Secured to the side bars A A, depending therefrom, are straps F, to the lower ends of which are pivoted the levers G G, carrying at their rear ends the seats H H for the operators or planters.

I indicates the plow-beam or the furrow-beam, which is pivoted at its forward end to the bars A A and carries at its rear end the furrow opener and closer J.

K indicates a lever pivoted to the cross-bar C, as shown in Fig. 2, and connected by means of link L with the beam I, as also shown in said Fig. 2, by means of which the beam and the furrow-opener may be raised and lowered, as desired. This lever K is provided with a pawl M, which when the rear end of the lever is thrown down and the furrow-opener is elevated from the ground is adapted to engage under the cross-bar C and hold the beam and the furrow-opener in their elevated position.

The lever is further provided with a hand-piece N and a rod O, which latter is connected with the pawl, so that by actuating the hand-piece the pawl may be thrown out of engagement with the bar, so as to permit the beam and the furrow-opener to assume working position.

Pivoted to the bar C is a yoke P, which extends forwardly and is connected at its front end by means of a link Q with the beam I, as clearly shown in Figs. 1 and 2, the side arms of the said yoke P being serrated or provided with notches R to receive the horizontal bar S of another yoke T, secured at its ends to the levers or arms G.

It will be seen upon reference to Fig. 2 that the weight of the operators or persons sitting upon the seats H will, acting through the yokes T and P and link Q, serve to press the furrow-opener down into the ground a greater or less distance, according to the adjustment of the yoke T relatively to the yoke P. By varying the position of the cross-bar S of the yoke T relatively to the yoke P the leverage exerted upon the beam may be varied or controlled, as circumstances may require.

The furrow-opener J, to which we have before referred, comprises two plates united at their forward ends, so as to form a vertical depending cutting-blade U and horizontal wings or blades V V. The depending cutting-blade extends backward about one-half the distance of the furrow-opener, and at a point above that at which the said blade terminates the horizontal wings or blades V are separated or cut away at their inner edges, as at W, so as to afford room for the insertion of the water devices employed in this class of machines. The outer edges of the rearward extensions of the horizontal blades are curved or bent downward and inward toward each other, as at X, Fig. 4, so as to cause the dirt to be carried or forced inward over the plant which has been inserted into the furrow by the operators sitting upon the seats H.

Passing vertically through the block B at the forward end of the frame is a pin or bolt Y, which also passes through a block or frame Z, to which the shafts are designed to be attached, as clearly shown in Fig. 3. The rear faces of the block B and the block or frame Z are each provided with a vertical slot $a$, which when brought into alignment one with the other, as shown in Fig. 3, are adapted to receive a flattened rod or lever $b$, which carries at its upper end a foot-piece $c$ and at its lower end a scraper $d$, which latter is designed to lie close to the front supporting-wheel $e$, as shown in Fig. 2. From this construction it will be seen that so long as the scraper-rod $b$ is in engagement with both blocks B and Z the front truck or frame Z, to which the shaft or pole is attached, cannot turn upon the bolt Y, thereby insuring the travel of the machine in a straight line.

When it is desired to turn the machine, the driver presses with his foot upon the foot-piece $c$ and rocks or tips the lever or rod $b$ and throws its lower portion out of engagement with the frame or block Z.

Having thus described our invention, what we claim is—

1. In a machine of the class described, the combination, with the main frame, of the beam I, pivoted to the main frame, the furrow-opener carried by the beam, and a beam or beams G, pivoted to the frame and supported upon the furrow-opener beam, all substantially as shown and described.

2. In a machine of the class described, the combination, with the main frame, of the furrow-opener beam I, the beam or lever G, pivoted to the main frame and supported upon the furrow-opener beam I, and an adjustable connection between the said beam I and the beam G, whereby the leverage of the latter beam may be varied as desired.

3. In a machine of the class described, the combination, with the main frame A, of the pivoted furrow-opener beam I, a yoke or frame P, pivotally secured to the main frame and connected with the furrow-opener beam by a link Q, and the beams G, also pivoted to the main frame and provided with a yoke T to engage the yoke P, all substantially as shown and described.

4. In combination with the main frame, furrow-opener beam I, and the pivoted beams G, the yoke P, pivoted to the main frame and connected to the furrow-opener beam by a link Q and having its side bars notched or serrated, as shown, and the yoke T, secured to the beams G and adapted to engage the notches or recesses in the side bars of the frame P.

5. In a machine of the class described, the combination, with the main frame and the beam I, of the lever K, pivoted to the main frame and connected with the beam by means of a link L, and a pawl M, adapted to engage one of the cross-bars of the main frame when the lever is depressed, all substantially as shown and described.

6. In a machine of the class described, the combination, with a main frame, of a block or frame Z, pivoted thereto at its forward end, and a lever $b$, pivoted to the main frame and adapted to engage slots formed in the main frame and in the frame Z, all substantially as shown and described.

7. In combination with a main frame having a block B at its forward end, said block having a slot or recess $a$ in its rear face, a supplemental frame or block Z, provided with a wheel $e$ and connected with the block B of the main frame by means of a bolt Y, and a lever $b$, pivoted to the block B and adapted to enter the slot $a$ and a corresponding slot in the frame or block Z.

8. In a machine of the class described, the combination, with a main frame, of the pivoted truck and the combined scraper and locking device $b\ c\ d$, secured to the main frame, all substantially as shown and described.

9. In a machine of the class described, a combined furrow opener and coverer comprising the horizontal plates V V, united at their forward edges to form the depending vertical cutting-blade U, said plates V V being separated from each other at their inner opposing edges and having their outer rearward edges bent downward and inward to form wings X, as and for the purpose set forth.

In witness whereof we hereunto set our hands in the presence of two witnesses.

NILS O. STARKS.
ANDREW G. FELLAND.

Witnesses:
JOHN A. JOHNSON,
W. R. BAGLEY.